(12) United States Patent
Schinkel et al.

(10) Patent No.: US 10,939,170 B2
(45) Date of Patent: Mar. 2, 2021

(54) PERSONALIZED MULTICAST CONTENT

(71) Applicant: Koninklijke KPN N.V., Rotterdam (NL)

(72) Inventors: Dolf Schinkel, Hillegom (NL); Anton Havekes, Bergschenhoek (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

(21) Appl. No.: 16/494,530

(22) PCT Filed: Apr. 25, 2018

(86) PCT No.: PCT/EP2018/060556
§ 371 (c)(1),
(2) Date: Sep. 16, 2019

(87) PCT Pub. No.: WO2018/197542
PCT Pub. Date: Nov. 1, 2018

(65) Prior Publication Data
US 2020/0092609 A1 Mar. 19, 2020

(30) Foreign Application Priority Data
Apr. 26, 2017 (EP) ..................... 17168114

(51) Int. Cl.
*H04N 21/458* (2011.01)
*H04N 21/24* (2011.01)
(Continued)

(52) U.S. Cl.
CPC ....... *H04N 21/458* (2013.01); *H04N 21/2402* (2013.01); *H04N 21/2668* (2013.01); *H04N 21/6405* (2013.01); *H04N 21/812* (2013.01)

(58) Field of Classification Search
None
See application file for complete search history.

(56) References Cited

U.S. PATENT DOCUMENTS

2001/0043613 A1* 11/2001 Wibowo ............... H04J 3/1682
370/468
2002/0114334 A1* 8/2002 Yang ................... H04L 12/2874
370/395.1
(Continued)

FOREIGN PATENT DOCUMENTS

EP 1914989 A1 4/2008

OTHER PUBLICATIONS

PCT International Search Report and Written Opinion, PCT International Application No. PCT/EP2018/060556, dated Jun. 29, 2018, 19 pages.
(Continued)

*Primary Examiner* — Fernando Alcon
(74) *Attorney, Agent, or Firm* — McDonnell Boehnen Hulbert & Berghoff LLP (57) ABSTRACT

A user device (15) may be arranged to control insertion of personalized content into multicast content. The user device may be arranged for sending a request to a personalized content provider system (12) and receiving personalized content in response to the request, and may further be arranged for storing a personalized content token (25). The request for personalized content may only be sent if the user device stores a personalized content token. In an embodiment, the request for personalized content may only be sent if the user device stores a personalized content token having at least one predetermined property.

10 Claims, 8 Drawing Sheets

(51) Int. Cl.
H04N 21/2668 (2011.01)
H04N 21/6405 (2011.01)
H04N 21/81 (2011.01)

(56) References Cited

U.S. PATENT DOCUMENTS

| | | |
|---|---|---|
| 2008/0271068 A1 | 10/2008 | Ou et al. |
| 2009/0094641 A1 | 4/2009 | Noll et al. |
| 2009/0168679 A1 | 7/2009 | Benjamin et al. |
| 2014/0068661 A1* | 3/2014 | Gates, III ............. H04N 21/441 725/34 |
| 2014/0282656 A1* | 9/2014 | Belyaev ............... H04N 21/251 725/14 |
| 2015/0248697 A1* | 9/2015 | Mahadevan ....... H04N 21/2396 705/14.53 |
| 2016/0182923 A1* | 6/2016 | Higgs .............. H04N 21/23424 725/34 |
| 2016/0366118 A1* | 12/2016 | Wang .................. H04L 63/0807 |
| 2016/0366491 A9 | 12/2016 | Heck et al. |
| 2017/0026671 A1* | 1/2017 | Neumeier .......... H04N 21/4667 |
| 2017/0169858 A1* | 6/2017 | Lee .................. H04N 21/41407 |
| 2018/0181996 A1* | 6/2018 | Matthews .......... G06Q 30/0269 |
| 2018/0246694 A1* | 8/2018 | Gibson ................. G06F 16/635 |

OTHER PUBLICATIONS

European Search Report, European Patent Application No. 171681141.1, dated Nov. 2, 2017, 12 pages.

* cited by examiner

Fig. 3A (Subscriber management system) Fig. 3B (Method for a personalized content provider system)

Fig. 4

(Method for a user device)

PERSONALIZED MULTICAST CONTENT

CROSS REFERENCE TO RELATED APPLICATIONS

The present application is a national stage entry of, and claims priority to, PCT/EP2018/060556, filed on Apr. 25, 2018, which claims priority to European Patent Application EP 17168114.1, filed in the European Patent Office on Apr. 26, 2017, both of which are hereby incorporated in their entirety herein by reference.

FIELD OF THE INVENTION

The present invention relates to personalized multicast content. More in particular, the present invention relates to a method for a user device, such as a set-top box, to control insertion of personalized content into multicast content, and a method for a personalized content provider to provide personalized television content to user devices.

BACKGROUND OF THE INVENTION

It is known to obtain personalized content via the Internet. When a user browses the Internet, she may receive personalized advertisements. These personalized advertisements may be selected automatically on the basis of cookies on the user's device, and/or on the basis on the user's Internet address. When using the Internet, personalized advertisements and other content may be downloaded together with other content via the same download channel.

Advertising on television is also widely known: television programs may contain time slots for inserting advertisements. However, television advertisements are broadcast to a large number of viewers and are normally not personalized. In large countries, such as the USA, the advertisements inserted into television programs may be geographically determined, that is, viewers in California may watch different advertisements than viewers in Massachusetts. Still, all viewers in California will watch the same advertisements.

It is, therefore, desirable to be able to provide personalized television advertisements which may not, or not only, depend on the location of the viewer but which may depend on the preferences of the viewer, for example. The viewer's preferences may be determined, for example, by registering which television programs a viewer typically watches. It is obvious that if the television advertisements are geared towards the user's preferences, the advertisements will be more effective. Instead of, or in addition to personalized advertisements, other personalized content may be offered to television viewers.

Providing personalized television content is complicated by the fact that a television content distributor normally broadcasts television content to a large number of viewers, so that all viewers receive the same content. Personalizing television content at the television content distributor involves replacing broadcast content per viewer or group of viewers, thus creating multiple parallel broadcast channels. It will be clear that personalizing television content at the television content distributor is not readily scalable and is therefore limited to a coarse personalization, providing only a limited number of viewer groups with different television content.

It is possible to obtain personalized television content from a personalized television content distributor, such as an advertisement distributor. However, a personalized television content provider uses a different channel from the television content distributor. While the television content distributor may use a broadcast channel to transmit the broadcast television content to the user devices, the personalized television content provider may use another channel, such as a so-called backchannel, to transmit information to the user devices. While the broadcast channel may be designed to transmit large amounts of data and therefore may have a large bandwidth, the bandwidth of a backchannel may be limited, as it is primarily designed for transmitting control data. Transmitting a single television advertisement over a backchannel may be feasible, but transmitting thousands of different advertisements over the backchannel simultaneously may not feasible, and may lead to unacceptable delays.

Even if the television content distributor and the personalized content distributor are the same, two or more different channels having different bandwidths may be used, and the problem of transmitting large amounts of different personalized content items over a channel having a limited bandwidth remains.

SUMMARY OF THE INVENTION

The invention aims to solve these and other problems of the prior art by providing a method to control insertion by a user device of personalized content into multicast content, which user device comprises a network interface configured for receiving multicast content from a multicast content provider system, sending a request for personalized content to a personalized content provider system, receiving personalized content from a personalized content provider system in response to the request; a processor configured for inserting the personalized content into the multicast content; and a token storage configured for storing a personalized content token; wherein the method comprises checking whether the token storage stores a personalized content token, and sending the request for personalized content only if the token storage stores the personalized content token.

By sending a request for personalized content only if the user device stores a personalized content token, the amount of personalized content transmitted, and hence the required bandwidth of the backchannel or other auxiliary channel can be controlled in a simple yet effective manner. For example, only a limited number of user devices may store a personalized content token, and therefore only a limited number of user devices may be able to send a request for personalized content. It is therefore possible to control the use of the backchannel (or other communication channel over which personalized content is transmitted) by controlling the number of user devices storing a personalized content token. The number of user devices storing a personalized content token may be controlled by distributing personalized content tokens and/or by deleting personalized content tokens from user devices.

It will be understood that the backchannel or its equivalent may be a two-way channel. In some embodiments, the backchannel may comprise two one-way channels which together provide two-way communication. The term backchannel may be used in this document to refer to a unicast channel, in contrast with the term broadcast channel, which may refer to a multicast channel.

A personalized content token may comprise a number, or a set of numbers, which may be stored in a suitable token storage in a user device. The user device may be able to determine whether the number, or set of numbers, stored in a token storage is a valid personalized content token, for example by comparing the stored number(s) with a predetermined format and/or by carrying out a cryptographic operation on the token, thus verifying its validity. Such verifying methods may be known per se. Sending a request for personalized content may therefore not only depend on whether the user device stores a personalized content token, but also on at least one property of the stored personalized content token, such as a predetermined property which allows its validity to be determined. In an embodiment, therefore, the personalized content token has at least one predetermined property.

In an embodiment, the validity of a personalized content token may be limited in time. That is, a personalized content token may define a time period in which personalized content may be requested. This may serve to better control the bandwidth of the backchannel or its equivalent, allowing a different assignment of user devices at a future point in time. For example, a user device may only request personalized content within a time period after receiving a personalized content token. Thus, the period of validity of a token may be predetermined. For example, on reception of a token, the period of validity may start immediately, or may start after a delay. A token may have a period of validity which lies in the future, for example the near future, such as "from 8:00 until 18:00 hours tomorrow".

The at least one predetermined property may include a token identification number, which may be unique. As mentioned above, each personalized content token may include a number or a set of numbers. At least one of those numbers may be a token identification number. A property may include an entire token identification number, or only part of a token identification number. That is, a property may correspond with one or more digits of a token identification number. For example, in a specific embodiment only those tokens whose token identification numbers end in the digit "6" may allow their user devices to send a request for personalized content, while those user devices storing tokens of which the token identification number does not end in the digit "6" may not send such a request.

Additionally, or alternatively, the at least one predetermined property may comprise a user profile. Such a user profile may be associated with the user device and may correspond with the multicast content received by the user device and therefore selected by the user. That is, the user device may for example collect metadata regarding the received multicast content and derive a user profile from these metadata. Thus, the token may reflect the preferences of the user.

In a further embodiment, the method may further comprise comparing the user profile and a target profile to determine a degree of similarity, and sending a request for personalized content only if the degree of similarity exceeds a threshold value. That is, a personalized content token may be said to match a predetermined property if the user profile is sufficiently similar to a target profile. It will be recalled that the user profile may be equal to or part of a predetermined property of a token. The threshold value may be static, that is predetermined, or dynamic, that is adjustable. In some embodiments, a threshold value may depend on the momentary available bandwidth of the channel over which the personalized content is sent to the user device. A threshold value may be determined individually for each user device, or for a group of user devices collectively.

The user device may further be arranged for detecting trigger messages in the multicast content, and the method may further comprise inserting the personalized content only in response to a trigger message. That is, the personalized content token may determine whether personalized content may be requested or received, while a trigger message may determine whether the user device inserts the personalized content into the multicast content. In addition, a trigger message may determine the timing of the insertion. Although trigger messages may be contained in the multicast content to indicate where other content may be inserted, embodiments can be envisaged in which the trigger messages and the multicast content may be sent to a user device separately.

In an embodiment, the method may further comprise sending the stored personalized content token together with the request to the personalized content provider system. This offers the advantage of a single transmission. In other embodiments, the stored personalized content token and the request may be sent separately, at different points in time.

In an embodiment, the method for a user device may further comprise receiving multicast content, receiving personalized content, and inserting the personalized content into the multicast content. In such an embodiment, the personalized content may, for example, comprise advertisements, which may be inserted into appropriate time slots in the broadcast television content. In this way, personalized advertisements may be inserted into and between broadcast television programs, for example, the personalized content being personalized television content. However, the invention is not so limited and may also relate to inserting personalized video telephone content, as may be used in FaceTime® or Skype®, for example. Personalized content may comprise television programs or films. Personalized television content is therefore not limited to personalized advertisements.

Although the user device may insert the personalized content into the multicast content itself, it may in some embodiments only control the inserting. In the latter case, a separate insertion device may be provided, which insertion device is then controlled by the user device.

In an embodiment, the user device may comprise at least one of a television apparatus, a laptop computer, a tablet device and a smartphone, and the method further comprises playing out the personalized broadcast content. Thus, the obtained personalized (television) content may be played out by a suitable user device. If the user device is a set-top box or similar device, the obtained personalized (television) content may be played out by a suitable additional device which is physically and/or functionally connected to the set-top box.

The invention also provides a method for a personal content provider system to provide personalized content to user devices, which personal content provider system may comprise a network interface configured for receiving requests from user devices, and sending personalized content in response to the requests, which method may comprise receiving a request from a user device, checking whether the request is from a user device storing a personalized content token, and sending personalized content only to the user device if the request is from a user device storing a personalized content token. By sending personalized content only to a user device having a personalized content token, the amount of personalized content sent by the personal content provider may be efficiently controlled.

The method for a personal content provider system to provide personalized content to user devices may further comprise receiving a personalized content token together with the request. That is, the request received from a user device may or may not be accompanied by a personalized content token received from the same user device. If the personal content provider system receives a personalized content token, it can check whether the personalized content token is valid and only send personalized content to user devices from which a valid personalized content token was received. In such embodiments, a double mechanism is provided: the user device only sends a request if it has a valid personalized content token, and the personal content provider system only sends the requested personalized content if the request was accompanied by a valid personalized content token. Such a double mechanism provides a greater flexibility and control. Embodiments can be envisaged in which user devices can request personalized content even if they don't store a personalized content token. In such embodiments, the token check by the personal content provider system may still achieve the desired effect.

The invention further provides a method for a subscriber management system to control insertion, by user devices, of personalized content into multicast content, wherein each user device comprises a network interface configured to send a request for the personalized content only if the user devices stores a personalized content token, which method may comprise receiving first data indicative of an available bandwidth on a communication channel between a personalized content provider system and a plurality of user devices, receiving second data indicative of an average size of a personalized content item, determining, by comparing the first data and the second data, a maximum number of user devices that can receive personalized content items, and storing personalized content tokens at a number of user devices not exceeding the determined maximum number of user devices.

Transmitting personalized content tokens may include first transmitting tokens to a first group of user devices and subsequently transmitting tokens to a second group of user devices, the first group and the second group together consisting of at most the maximum number of user devices. That is, the personalized content tokens may be distributed gradually, initially to a first group of one or more user devices and then to a second group of user devices, and possibly later to a third or further group. The tokens which may be distributed to the second group may be transmitted only after checking the available bandwidth, for example, and/or only after a certain amount of time has lapsed. It is noted that any transmitted personalized content tokens may not be contained in the multicast content, but may be separate from the multicast content, and may serve to obtain personalized content.

The invention also provides a computer readable medium comprising non-transitory data representing instructions which allow a processor to carry out any of the methods described above. The computer readable medium may comprise a tangible carrier such as a DVD or a USB stick, for example. Alternatively, the non-transitory data may be stored on a server from which they may be downloaded using the Internet. The non-transitory data may contain software instructions which can be carried out by the processor of a device, such as a server, a user device (for example a smartphone), and/or a monitoring device.

The invention may be practised with a single personalized content distributor, or with two or more personalized content distributors. In the latter case, requests for personalized content may be transmitted to each of the personalized content distributors separately. Similarly, the invention may also apply to situations in which two or more multicast content distributors are involved. The invention may therefore apply to one or multiple personalized content distributors and one or multiple multicast content distributors.

The invention yet further provides a user device configured to control insertion of personalized content into multicast content, which user device comprises a network interface configured to receive multicast content from a multicast content provider system, send a request for personalized content to a personalized content provider system, and receive personalized content from a personalized content provider system in response to the request; a processor configured to insert the personalized content into the multicast content, and a token storage configured to store a personalized content token; wherein the processor is further configured to check whether the token storage stores a personalized content token, and cause the network interface to send the request only if the token register stores the personalized content token.

In the user device, the processor may be arranged to check the personalized content token for at least one predetermined property, and to cause the network interface to send the request only if the personalized content token has the at least one predetermined property.

In an embodiment, at least one predetermined property may comprise a user profile, which user profile may be associated with the user device.

The processor of the user device may further be configured to compare the user profile and a target profile to determine a degree of similarity, and send the request for personalized content only if the degree of similarity exceeds a threshold value.

The invention even further provides a subscriber management system for controlling providing personalized multicast content to a plurality of user devices, each user device comprising a network interface configured to receive multicast content from the multicast content provider system, send a request for personalized content to a personalized content provider system, and receive personalized content from a personalized content provider system in response to the request; a processor configured to insert the personalized content into the multicast content, and a token storage configured to store a personalized content token; the processor further being configured to check whether the token storage stores a personalized content token having at least one predetermined property, and cause the network interface to send the request only if the token register stores the personalized content token; wherein the subscriber management system may comprise an input interface configured for receiving first data indicative of an available bandwidth on a communication channel between a personalized content provider and a plurality of user devices, and for receiving second data indicative of an average size of a personalized content item, a processor configured for determining, by comparing the first data and the second data, a maximum number of user devices that can receive personalized content items, and an output interface configured for sending personalized content tokens to a number of user devices not exceeding the determined maximum number of user devices.

BRIEF DESCRIPTION OF THE DRAWINGS

The present invention will further be explained with reference to exemplary embodiments illustrated in the drawings, in which.

DETAILED DESCRIPTION OF EMBODIMENTS

The present invention provides methods for providing personalized content, such as personalized television content, to a group of user devices. The methods may involve selecting user devices which may receive personalized content and may therefore involve determining the size of the group of users. In particular, the methods may involve controlling the bandwidth use of the channel through which personalized content is provided to the user devices. In embodiments of the invention, the number of user devices receiving personalized content may be controlled by storing personalized content tokens only in those user devices which are allowed to receive personalized content, and to arrange a personalized content provider system to only transmit personalized content to a user device which stores a personalized content token. In other embodiments, personalized content provider systems may receive a list of user devices allowed to receive personalized media content.

A method for a personalized content distributor may comprise receiving a request for personalized content from a user device, checking whether the request is from a user device storing a personalized content token, and transmitting personalized content only to the user device if the user device stores a personalized content token.

The invention may be applied in the field of broadcasting television content, but those skilled in the art will understand that the invention is not so limited and that the invention may also be used with other media content, such as internet pages, internet radio, and other content.

It is noted that the term multicast is often referred to as a class of internet protocols. In this invention the term multicast may also refer to a more generalized distribution method for delivering a single signal to many receiving devices, such as satellite distribution, terrestrial distribution and cable distribution. Known examples of such techniques are DVB (Digital Video Broadcasting) techniques, ATSC (Advanced Television Systems Committee) Standards techniques, and DOCSIS (Data Over Cable Service Interface Specification) techniques.

Figure 1:
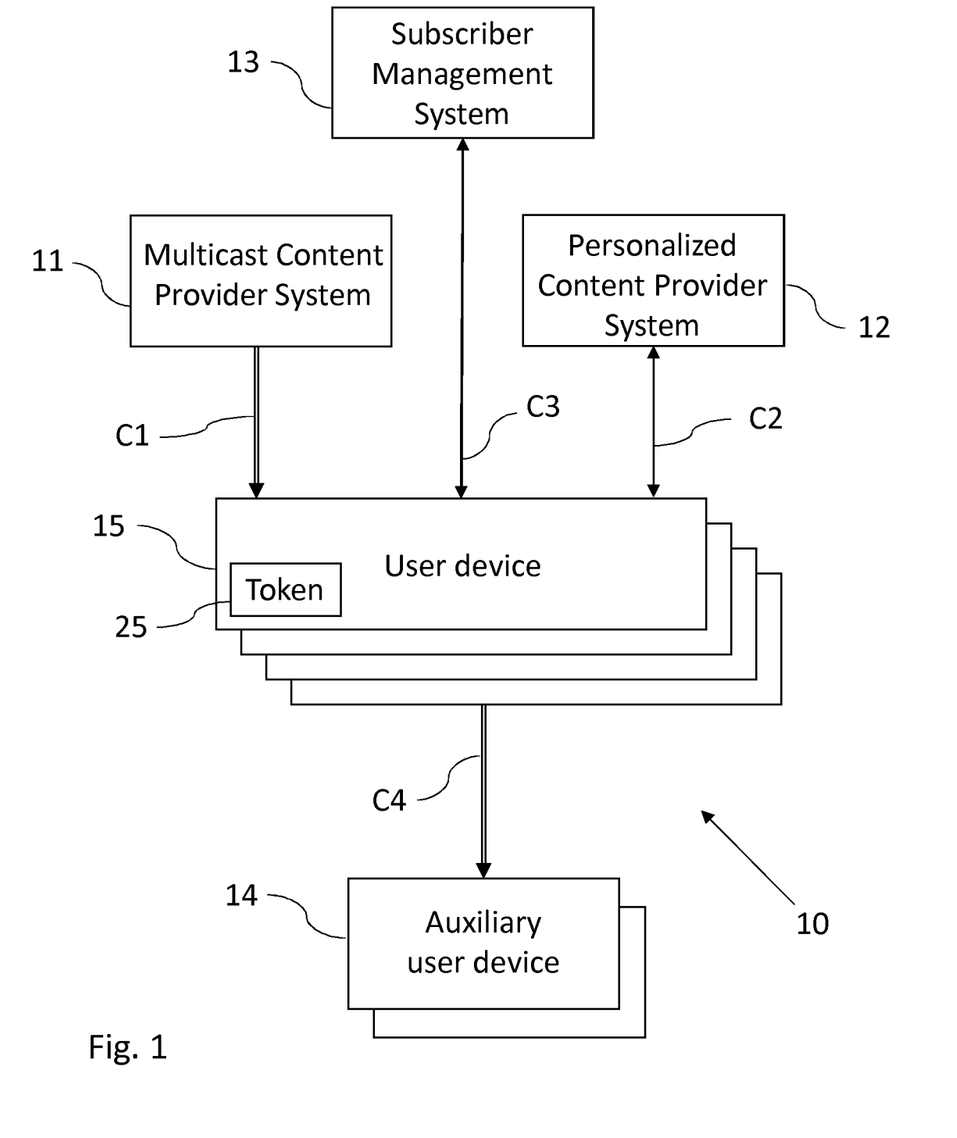
FIG. 1 schematically shows an exemplary embodiment of a broadcast system in which the invention may be applied.

The multicast system 10 schematically illustrated in FIG. 1 may include a multicast content provider system 11, a personalized content provider system 12, a subscriber management system 13, auxiliary user devices 14, and user devices 15. In some embodiments, the multicast system 10 may include more than one personalized content provider system 12. The multicast system 10 may include a plurality of user devices 15, and may also include a plurality of auxiliary user devices 14.

The user devices 15 may include set-top boxes, television devices having an integrated set-top box, and software applications on smartphones or (laptop or desktop) computers. The (optional) auxiliary devices 14 may include television devices, computer monitors, laptop computers, and other devices having a screen in case the content includes images. It will be understood that when the user device 15 includes a screen, as in the case of a smartphone, for example, an auxiliary user device 14 may not be required.

The multicast content provider system 11 may be arranged to provide multicast content, such as television content, to the user devices 15 via a first connection C1, which may include a multicast channel, a multicast network, or both. The personalized content provider system 12 may send personalized content to the user devices 15 via a second connection C2, which may include a so-called backchannel. Such a backchannel typically has a limited bandwidth, especially when compared with the multicast channel of the first connection C1. The subscriber management system 13 may be connected to the user devices 15 via a third connection C3, which may include a unicast connection, for example an HTTP/TCP/IP unicast connection using JSON or XMC messages.

In some embodiments, at least one of the user devices 15 may be coupled with an auxiliary device 14 via a fourth connection C4. When the user device 15 is a set-top box, for example, the auxiliary user device 14 may be a television apparatus, and the fourth connection C4 may be constituted by a cable connection. When the user device 15 is a smartphone, for example, the auxiliary user device 14 may be a tablet device, for example, and the fourth connection C4 may be constituted by a Bluetooth® connection, for example. In accordance with the invention, a user device 15 may include a token storage configured for storing one or more personalized content tokens 25, which may also be referred to as tokens.

In the present example, the personalized content may include personalized advertisements, in which case the personalized content provider system 12 may be referred to as advertisement provider or ad provider.

Figure 2A:
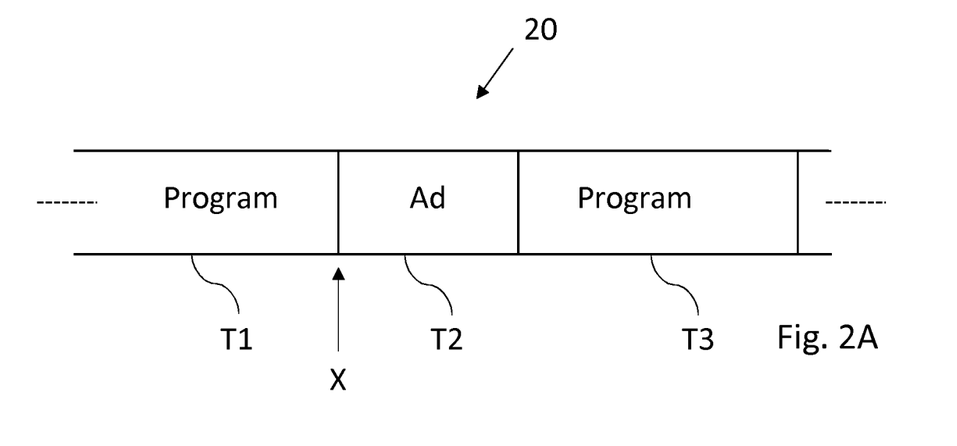
FIG. 2A schematically shows an exemplary embodiment of media content in which user content may be inserted.

The multicast content provider system 11 may broadcast television content, such as television programs, for example. The broadcast may contain other content, such as advertisements, in addition to programs. An example is schematically illustrated in FIG. 2A, where part of broadcast content 20 is shown. The content 20 includes a first program part in a first time slot T1, an advertisement (ad) in a subsequent second time slot T2 and a second program part in a third time slot T3. The advertisement in the second time slot T2 may be generic, that is, it may be the same for all viewers and therefore for all user devices. However, advertisement providers may wish to target specific viewers depending on their location, for example. For example, a local theatre may wish to advertise only within a radius of 20 km, for example. Additionally, or alternatively, the local theatre may only want to reach people who are interested in going to the theatre, thus taking personal preferences into account.

Figure 2B:
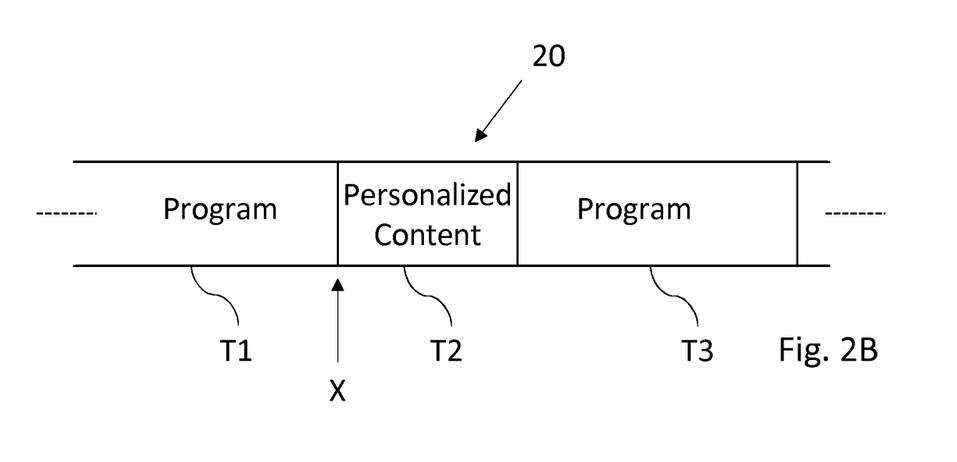
FIG. 2B schematically shows an exemplary embodiment of media content in which user content has been inserted.

To target specific viewers, personalized advertisements may be inserted in the second time slot T2 of FIG. 2A, resulting in the broadcast content 20 of FIG. 2B. It is recalled that the programs in the first time slot T1 and the third time slot T3 may be broadcast by the multicast content provider system 11 using the first connection C1 illustrated in FIG. 1, and that the first connection C1 may have a wide bandwidth (that is, the first connection C1 may be a broadband connection). However, the personalized content, such as an advertisement to be inserted in the second time slot T2, may not be broadcast by the multicast content provider system 11 but may be transmitted by the personal content provider system 12 of FIG. 1, for example, using the second connection C2. This second connection C2 may not be a broadband connection. Instead, the second connection C2 may have a much more limited bandwidth than the first connection C1. This may lead to problems when a large number of user devices are to receive personalized content, such as a personalized advertisement. At the moment X, a large number of user devices may require a personalized advertisement, which means that a large amount of data will have to be transmitted via the second connection C2 at essentially the same moment. This may require, at the moment X, a bandwidth which is larger than the bandwidth of the first connection C1. However, the second connection C2, which may be constituted by a so-called backchannel, may have a bandwidth which is significantly smaller than the bandwidth of the first connection C1. As a result, the available bandwidth for transmitting personalized content may be much smaller than required, which may lead to transmission delays.

It is noted that not only the backchannel or equivalent communication channel, but also the personalized content provider system itself may have a limited bandwidth, that is, a limited capacity. The available capacity of the backchannel or equivalent channel may be known in advance. Alternatively, or additionally, the available bandwidth for personalized content may be continuously or repeatedly measured.

According to the invention, the number of user devices which receive personalized content at a certain moment or in a certain time period may be controlled by requiring that personalized content, such as advertisements, may only be transmitted to selected user devices. These selected user devices may be provided with a (personalized content) token indicating their permission to request and/or receive personalized content. In embodiments of the invention, the personalized content distributors (such as the personalized content provider system 12 in FIG. 1) may be configured for only sending personalized content to user devices provided with a token.

In some embodiments, therefore, the user device may check whether its token storage stores a token, and may additionally check whether the stored token is valid. A request for personal content may only be sent to the personalized content provider system if the token storage stores a token, preferably only if the token storage stores a token having at least one particular property which may be predetermined. One such property may imply that the token is valid, for example.

Figure 2C:
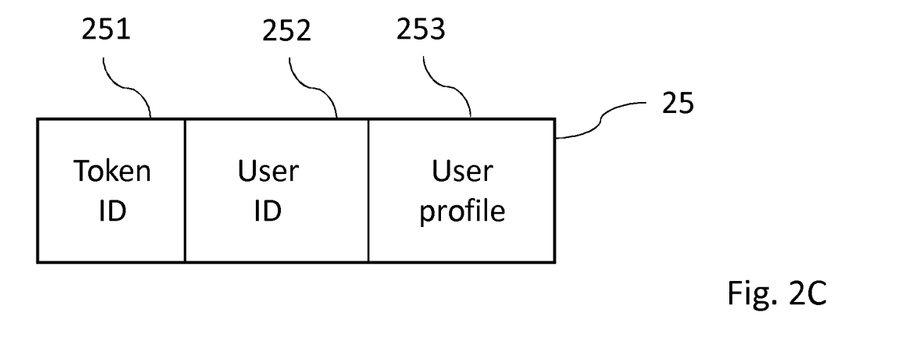
FIG. 2C schematically shows an exemplary embodiment of a personalized content token in accordance with the invention.

An exemplary embodiment of a personalized content token is schematically represented in FIG. 2C. The token 25 of FIG. 2C is shown to include a token identification (ID) section 251, a user identification (ID) section 252 and a user profile section 253. The token 25 may include further sections which are not shown in FIG. 2C. In some embodiments, a token may include only a single section, for example only a token ID section or only a user ID section. All sections may include numbers representing an identification, a user profile or other relevant information. Thus, a personalized content token may be constituted by a set of numbers, which numbers may have predetermined properties.

The token identification section 251 may include a unique identification of the token, and/or an identification which allows a receiver to determine that the token is valid. The unique identification may include a token identification number. In some embodiments, tokens may not have unique identifications.

The user identification which may be stored in the user identification section 252 may refer to the user device (15 in FIG. 1) in which the personalized content token 25 may be stored. The user identification may serve to identify the user device when a token is sent from a user device to a personalized content provider system. The user identification may alternatively, or additionally be used to identify the user device to which the token may be sent from a token issuing system, such as the subscriber management system (SMS) 13 shown in FIG. 1.

The user profile section 253 may store, as a user profile, preferences and other data concerning the device's user or users. Such preferences may be static or dynamic, static preferences being determined at one point in time and dynamic preferences being determined as time progresses. The user device may determine dynamic preferences from the programs watched by its user (or users), for example.

In some embodiments, a user device may send a request for personalized content only if the user profile matches a target profile. That is, the user device may check whether the token storage stores a token having at least one predetermined property, and in such embodiments the predetermined property may include a target profile the user profile may be compared with. In some embodiments, a perfect match between the user profile and a target profile may be required, while in other embodiments the user device may determine a degree of similarity between the user profile and the target profile, which degree of similarity may then be compared with a threshold value. That is, the user device may send a request for personalized content and/or a token to the personalized content provider system if the degree of similarity is equal to or exceeds the threshold.

Figure 3A:
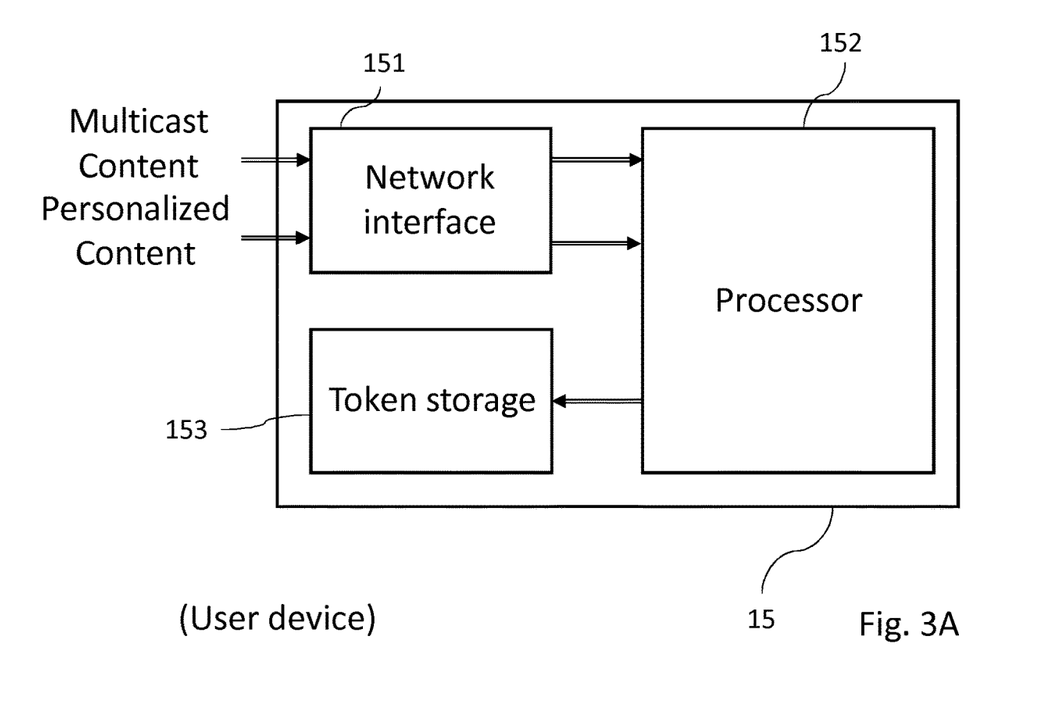
FIG. 3A schematically shows an exemplary embodiment of a user device according to the invention.

An exemplary embodiment of a user device according to the invention is schematically illustrated in FIG. 3A. The user device 15 of FIG. 3A may comprise a network interface 151, a processor 152, and a token storage 153. The user device 15 may comprise further components which are not shown in FIG. 3A.

The network interface 151 may be configured for receiving both multicast (broadcast) content and personalized content, for example via the first connection C1 (FIG. 1) and the second connection C2 (FIG. 1) respectively, as well as for receiving other data, for example control data and/or a token via the third connection C3, from the subscriber management system 13 in FIG. 1. The network interface may also be configured to send a request for personalized content to a personalized content provider system, while the personalized content may be received from the personalized content provider system in response to the request.

The processor 152 may be configured for inserting the received personalized content, such as advertisements, into the content stream (see FIG. 2A).

The token storage 153 may be configured for storing a token. The token may be stored when the user device was produced and may, in that case, be permanent. Alternatively, or additionally, the token may be received by the user device, for example from the subscriber management system.

The processor 152 may further be configured to check whether the token storage stores a token having at least one predetermined property, and to cause the network interface to send the request only if the token register stores the token. In some embodiments, the user device may send a token together with, or instead of, the request.

Figure 3B:
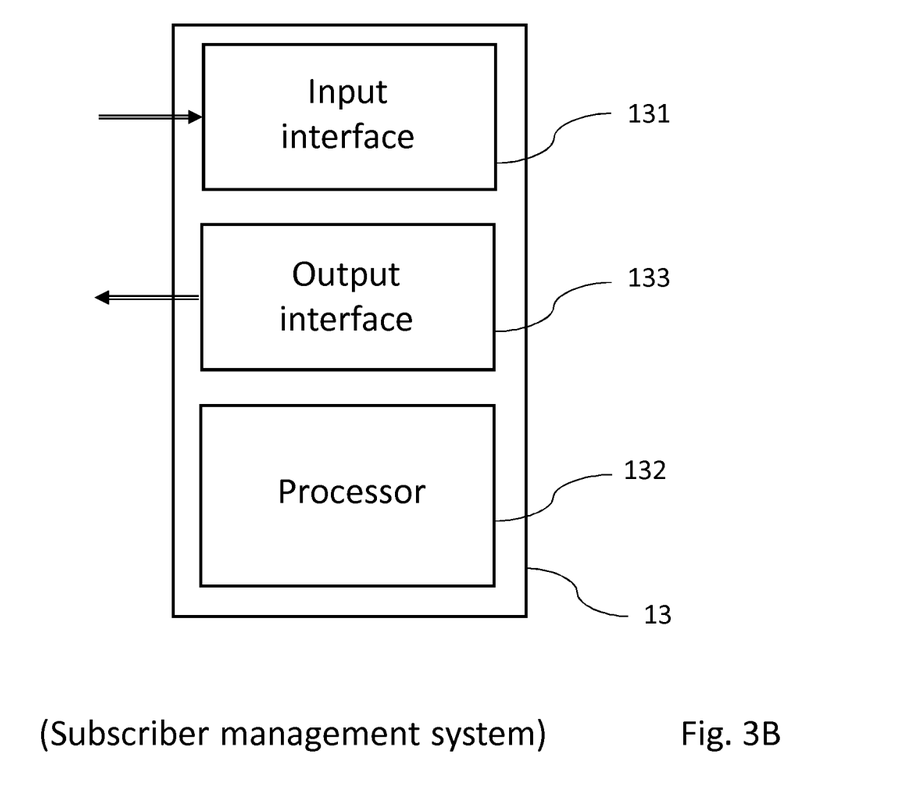
FIG. 3B schematically shows an exemplary embodiment of a subscriber management system according to the invention.

An exemplary embodiment of a subscriber management system for controlling the broadcasting of personalized multicast content to a plurality of user devices is schematically illustrated in FIG. 3B. The subscriber management system 13 may include an input interface 131, a processor 132 and an output interface 133. The input interface 131 may be configured for receiving first data indicative of an available bandwidth on a communication channel between a personalized content provider and a plurality of user devices, and for receiving second data indicative of an average size of a personalized content item. The processor 132 may be configured for determining, by using the first data and the second data, a maximum number of user devices that can receive personalized content items. The output interface 133 may be configured for transmitting tokens to at most the determined maximum number of user devices. That is, the output interface 133 may be configured for sending tokens to a number of user devices not exceeding the determined number of user devices.

It is noted that the subscriber management system 13 may be arranged to cooperate with user devices which may be configured to require a token to request personalized television content from a personalized content distributor.

Figure 4:
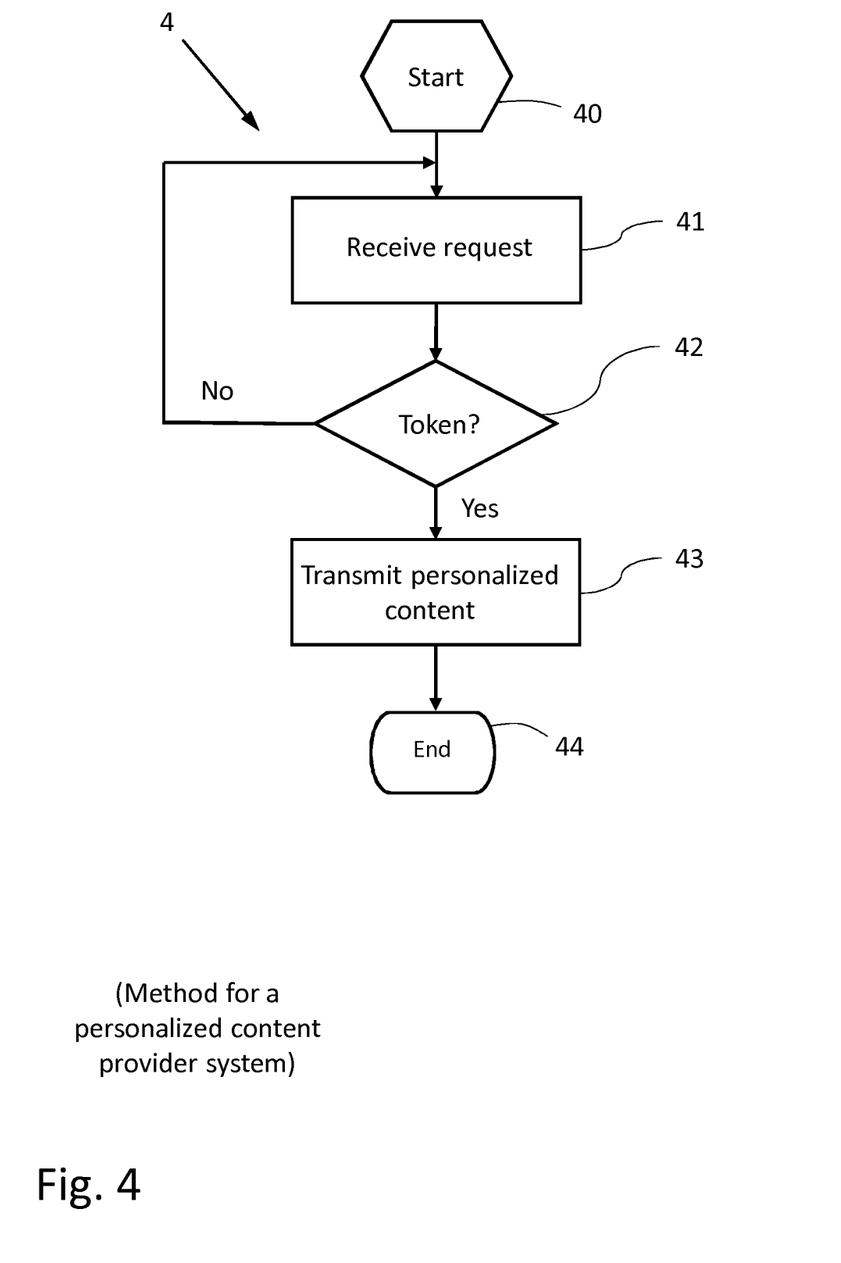
FIG. 4 schematically shows an exemplary embodiment of a method for a personalized content provider system according to the invention.

An embodiment of a method for a personalized content provider system is schematically illustrated in FIG. 4. The exemplary method 4 may start with action 40, in which the method may be initiated. In action 41, the personalized content provider system may collect input, such as one or more requests for personal content. In action 42, it is checked whether the request is received from a user device having a token. The token may be received together with the request, or the personalized content provider system may query the user device, for example.

If the request is not from a user device having a token, the method may return to action 41. If the requesting user device stores a token, the personalized content provider system may have to determine from which user device the token was received. To this end, a request may include a user device identification. Alternatively, the personalized content provider system may be able to identify the user device from which the request was received in another manner. Personalized content may then be sent to the identified user device in action 43. The method may end in action 44.

Figure 5:
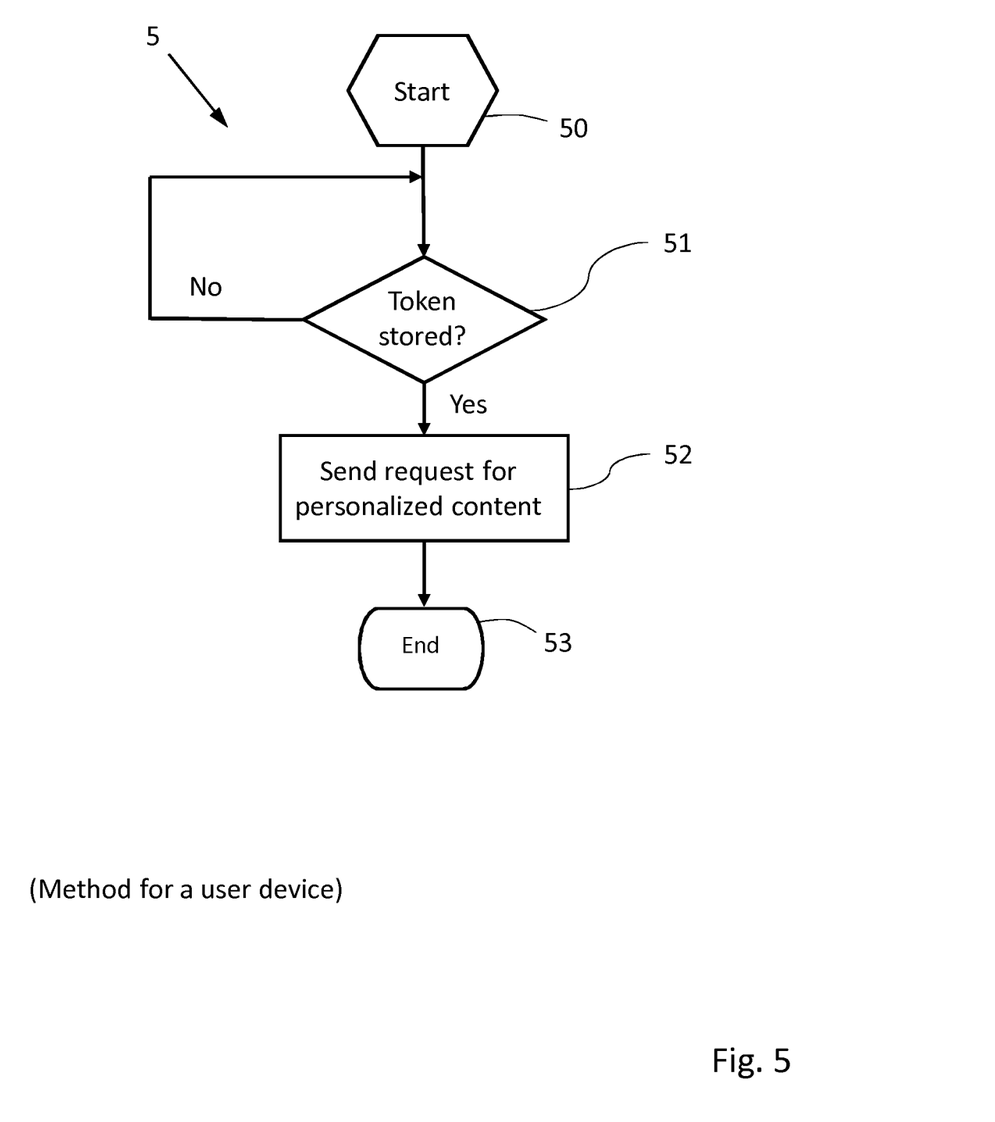
FIG. 5 schematically shows an exemplary embodiment of a method for a user device according to the invention.

An embodiment of a method for a user device is schematically illustrated in FIG. 5. The exemplary method 5 may start with action 50, in which the method may be initiated. During action 51, the user device checks whether its token storage contains a token having at least one predetermined property. If this is the case, the method continues with step 52. However, if the token storage does not contain a token having at least one predetermined property, then the method returns to step 51.

During action 52, the user device may transmit the request for personalized content, for example to personalized content provider system. The method may end in action 54.

Figure 6:
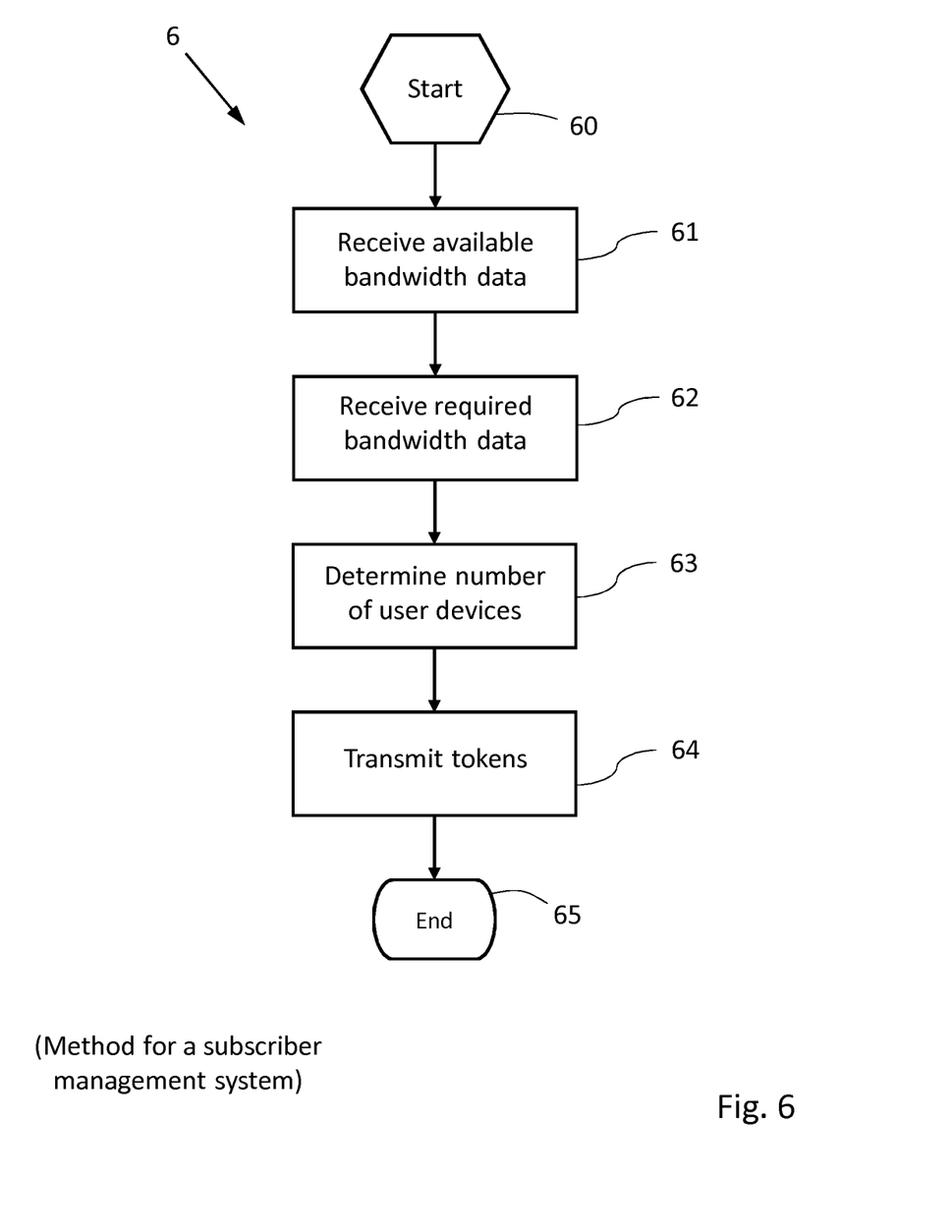
FIG. 6 schematically shows an exemplary embodiment of a method for a subscriber management system according to the invention.

An embodiment of a method for a subscriber management system is schematically illustrated in FIG. 6. The exemplary method 6 may start with action 60, in which the method may be initiated. During action 61, the subscriber management system may receive data indicating the bandwidth available for transmitting personalized content to user devices. These data may refer to the so-called backchannel, or another channel having a limited bandwidth. During action 62, the subscriber management system may receive data relating to the required bandwidth. These data may include the number of user devices and/or the average size of a personalized content item and/or the maximum size of a personalized content item. Such data may allow the subscriber management system to determine the maximum number of user devices that may receive personalized content. During action 64, the subscriber management system may store tokens at this maximum number of user devices, or to a smaller number. A smaller number may be used if other constraints apply, such as geographical location and/or user preferences. The tokens may be stored at the user devices by transmitting the tokens to the user devices, or by activating pre-stored tokens at the user devices. The method may end with action 65.

It is noted that a token may be a smart token, which may have a user profile of the user of a user device. The media content broadcast by the television distributor may include target data indicative for which target group personalized content, such as advertisements, is available. The target data may be match with a user profile by a user device.

The smart token may be based upon a personal profile of a user, which may include television (or other content) watching behaviour, for example which channels, films, and/or websites she watches. The personal profile may include information relating to location, income, family, and other personal information.

It is further noted that a user device may, in some embodiments, be referred to as client device.

As will be appreciated by those skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, for example, stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fibre, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the invention relates to all possible combinations of features recited in the claims.

Figure 7:
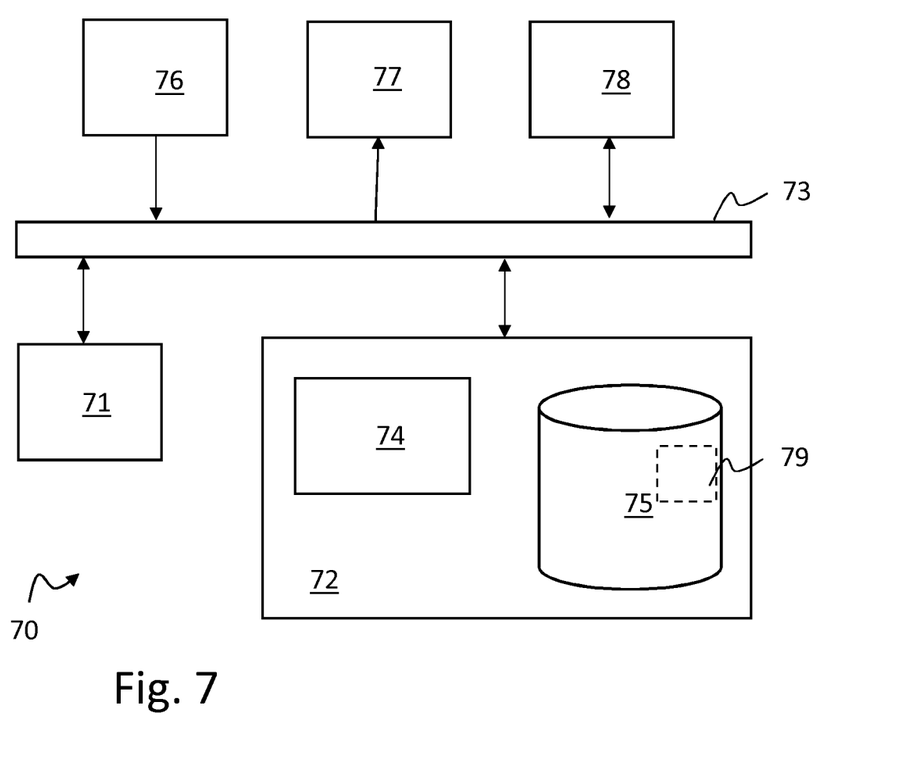
FIG. 7 is a schematic block diagram of a general system which may be employed in some or all of the disclosed methods.
Figure 8:
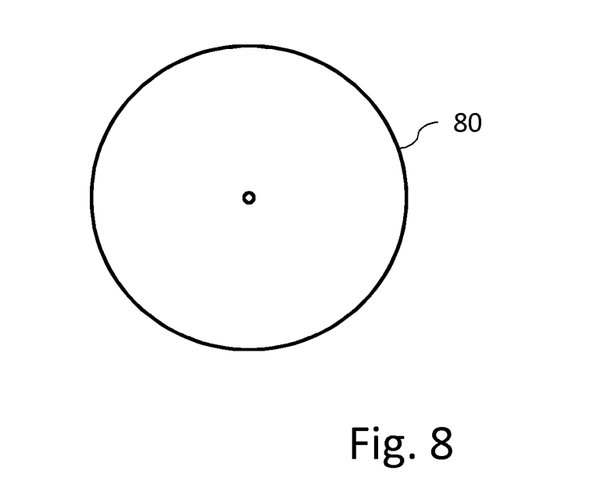
FIG. 8 schematically shows an embodiment of a computer readable medium comprising non-transitory data representing instructions which allow a processor to carry out a method according to the invention.

FIG. 7 is a block diagram illustrating an exemplary data processing system that may be used as a part of a user equipment or as a network node, such as base station.

Data processing system 70 may include at least one processor 71 coupled to memory elements 72 through a system bus 73. As such, the data processing system 70 may store program code within memory elements 72. Further, processor 71 may execute the program code accessed from memory elements 72 via system bus 73. In one aspect, data processing system 70 may be implemented as a computer that is suitable for storing and/or executing program code. It should be appreciated, however, that data processing system 70 may be implemented in the form of any system including a processor and memory that is capable of performing the functions described within this specification.

Memory elements 72 may include one or more physical memory devices such as, for example, local memory 74 and one or more bulk storage devices 75. Local memory may refer to random access memory or other non-persistent memory device(s) generally used during actual execution of the program code. A bulk storage device 75 may be implemented as a hard drive or other persistent data storage device. The data processing system 70 may also include one or more cache memories (not shown) that provide temporary storage of at least some program code in order to reduce the number of times program code must be retrieved from bulk storage device 75 during execution.

Input/output (I/O) devices depicted as input device 76 and output device 77 optionally may be coupled to the data processing system 70. Examples of input devices may include, but are not limited to, for example, a keyboard, a pointing device such as a mouse, a touchscreen, or the like. Examples of output device may include, but are not limited to, for example, a monitor or display, speakers, or the like. Input device 76 and/or output device 77 may be coupled to data processing system 70 either directly or through intervening I/O controllers. A network adapter 78 may also be coupled to data processing system 70 to enable it to become coupled to other systems, computer systems, remote network devices, and/or remote storage devices through intervening private or public networks. The network adapter 78 may comprise a data receiver for receiving data that is transmitted by said systems, devices and/or networks to said data processing system 70 and a data transmitter for transmitting data to said systems, devices and/or networks. Modems, cable modems, and Ethernet cards are examples of different types of network adapters that may be used with data processing system 70.

As pictured in FIG. 7, memory elements 72 may store an application 79. It should be appreciated that data processing system 70 may further execute an operating system (not shown) that can facilitate execution of the application. Applications implemented in the form of executable program code can be executed by data processing system 70, for example, by processor 71. Responsive to executing the application 79, the data processing system 70 may be configured to perform one or more operation as disclosed in the present application in further detail.

In one aspect, for example, data processing system 70 may represent a multipoint transmission control system MTC or a user device UE. In that case, application 79 may represent a client application which, when executed, configures data processing system 70 to perform the various functions described herein with reference to an MTC or a user equipment. Examples of an MTC include a base station of a telecommunications network providing cellular wireless access, for example a NodeB or an eNB. The user equipment can include, but is not limited to, a personal computer, a portable computer, a mobile phone, or the like.

In another aspect, data processing system 70 may represent a transmission node TN as described herein, in which case application 79, when executed, may configure data processing system 70 to perform operations as described in the present disclosure.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The abstract should not be used to limit the scope of the claims, and neither should reference numbers in the claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (for example, read-only memory devices within a computer such as CD-ROM disks readable by a CD-ROM drive, ROM chips or any type of solid-state non-volatile semiconductor memory) on which information is permanently stored; and (ii) writable storage media (for example, flash memory, floppy disks within a diskette drive or hard-disk drive or any type of solid-state random-access semiconductor memory) on which alterable information is stored.

It will therefore be understood by those skilled in the art that the present invention is not limited to the embodiments mentioned above and that many additions and modifications are possible without departing from the scope of the invention as defined in the appending claims.

The invention claimed is:

1. A method for a user device to control insertion by the user device of personalized content into multicast content, wherein the user device comprises a token storage, the method comprising:
   receiving multicast content from a multicast content provider system,
   sending a request for personalized content to a personalized content provider system, and
   receiving personalized content from a personalized content provider system in response to the request,
   inserting the personalized content into the multicast content,
   checking whether the token storage stores a personalized content token, the personalized content token indicating a permission to request personalized content; and
   sending the request for personalized content only if the token storage stores the personalized content token.

2. The method according to claim 1, wherein the personalized content token comprises a user profile, and wherein the method further comprises:
   comparing the user profile and a target profile to determine a degree of similarity; and
   sending the request for personalized content only if the degree of similarity exceeds a threshold value.

3. The method according to claim 1, further comprising:
   sending the stored personalized content token together with the request to the personalized content provider system.

4. A method for a personal content provider system to provide personalized content to user devices the method comprising:
   receiving a request from a user device,
   checking whether the user device is storing a personalized content token, the personalized content token indicating a permission to request personalized content; and
   sending the personalized content only to the user device if the user device is storing the personalized content token.

5. The method according to claim 4, further comprising:
   receiving a personalized content token together with the request.

6. A method for a subscriber management system to control insertion, by user devices, of personalized content into multicast content, the method comprising:
- receiving first data indicative of an available bandwidth on a communication channel between a personalized content provider apparatus and a plurality of user devices,
- receiving second data indicative of an average size of a personalized content item,
- determining, by comparing the first data and the second data, a maximum number of user devices that can receive personalized content items, and
- transmitting personalized content tokens to a number of user devices not exceeding the determined maximum number of user devices, the personalized content token indicating a permission to for the user device to request personalized content.

7. A non-transitory computer readable medium having instructions stored thereon for controlling insertion by a user device of personalized content into multicast content, wherein the user device comprises a token storage configured for storing a token, and is configured for receiving multicast content from a multicast content provider system, sending a request for personalized content to a personalized content provider system, receiving personalized content from a personalized content provider system in response to the request, and inserting the personalized content into the multicast content, and wherein the instructions, when executed by a processor of a system, cause the system to carry out operations including:
- checking whether the token storage stores a personalized content token, the personalized content token indicating a permission to request personalized content; and
- sending the request for personalized content only if the token storage stores the personalized content token.

8. A user device configured to control insertion of personalized content into multicast content, wherein the user device comprises:
- a network interface configured to:
  - receive multicast content from a multicast content provider system,
  - send a request for personalized content to a personalized content provider system, and
  - receive personalized content from a personalized content provider system in response to the request,
- a processor configured to insert the personalized content into the multicast content; and
- a token storage configured to store a personalized content token,
- wherein the processor is further configured to:
  - check whether the token storage stores a personalized content token, the personalized content token indicating a permission to request personalized content, and
  - cause the network interface to send the request only if the token register stores the personalized content token.

9. The user device according to claim 8, wherein the personalized content token comprises a user profile, wherein the user profile is associated with the user device, and wherein the processor is further configured to:
- compare the user profile and a target profile to determine a degree of similarity; and
- send the request for personalized content only if the degree of similarity exceeds a threshold value.

10. A subscriber management system for controlling providing personalized multicast content to a plurality of user devices, the subscriber management system comprising:
- an input interface configured for receiving first data indicative of an available bandwidth on a communication channel between a personalized content provider and a plurality of user devices, and for receiving second data indicative of an average size of a personalized content item,
- a processor configured for determining, by comparing the first data and the second data, a maximum number of user devices that can receive personalized content items; and
- an output interface configured for sending personalized content tokens to a number of user devices not exceeding the determined maximum number of user devices, the personalized content tokens indicating a permission for the user devices to request personalized content.

* * * * *